UNITED STATES PATENT OFFICE.

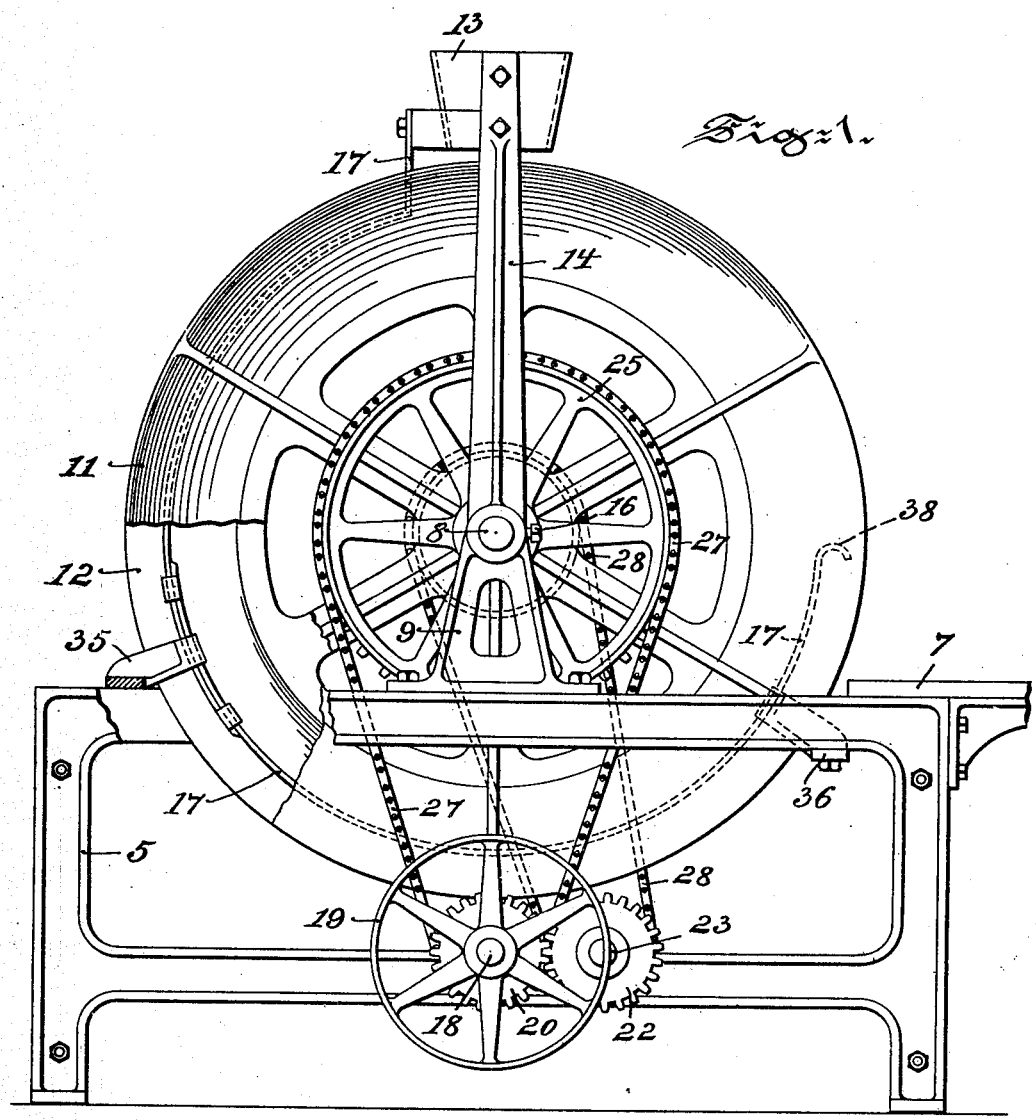

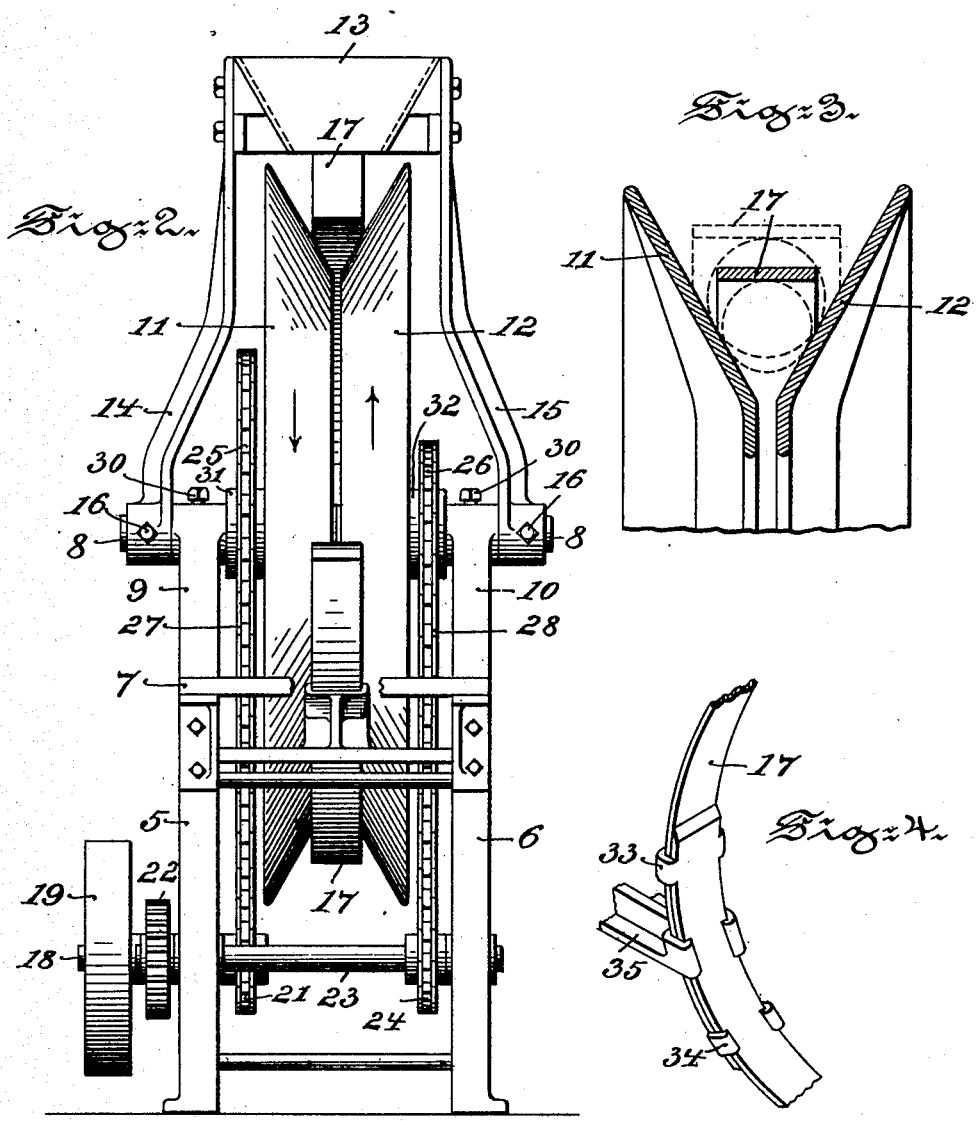

ROBERT M. TEMPLE, OF PHILADELPHIA, PENNSYLVANIA.

DOUGH KNEADING AND BALLING MACHINE.

No. 860,269.　　　　　Specification of Letters Patent.　　　Patented July 16, 1907.

Application filed April 25, 1907. Serial No. 370,166.

*To all whom it may concern:*

Be it known that I, ROBERT M. TEMPLE, a citizen of the United States, residing at the city of Philadelphia, in the county of Philadelphia and State of Pennsylvania, have invented certain new and useful Improvements in Dough Kneading and Balling Machines, of which the following is a specification My invention has relation to a machine for kneading dough in bread making into balls for rendering the mass more compact or dense and for more thoroughly breaking up the gas or air cells of the dough mass into infinitesimal cells, during the mechanical kneading and balling by the machine, preparatory to the baking, to provide ultimately a bread loaf of a finer spongy or cellular texture, and more wholesome and hence more digestible, than a dough for bread making could possibly be produced, by hitherto practiced methods, such as, simply permitting the same to rise after manual kneading for baking into a bread loaf.

The nature and general scope of my invention, will be more fully understood from the following description taken in connection with the accompanying drawings forming part hereof, in which Figure 1 is a side elevational view partly in broken section, of a combined kneading and balling machine, showing a feed hopper and an adjustable dough retaining band for maintaining the mass assuming form between two beveled faced disk-wheels arranged so as to be revolved in opposite directions at different rates of speed to each other for balling the dough mass and freeing the kneaded and balled dough thereby, away from the operative parts of the machine and containing or embodying the main features of my said invention. Fig. 2, is a front view of the machine, showing the general arrangement of the operative members of the machine, and of the actuating mechanism thereof, for revolving the beveled face disk-wheels, at different speeds with respect to each other. Fig. 3, is a view in elevation and in section of the beveled face disk-wheels of the machine, in broken section, and the adjustable telescoping dough retaining band connected with the feed hopper of the machine, for holding the dough-like mass shown in dotted outline in contact with the oppositely arranged beveled faces of the two disk-wheels, whereby due to the differences in speed of said disk-wheels in action the doughy mass is caused to not only be kneaded but also balled to compact or render the same more dense prior to being liberated from the machine, for the baking thereof; and, Fig. 4, is a perspective view, in a broken section, of the adjustable telescoping dough retaining band or device for holding the doughy mass in the action of the beveled face disk-wheels operating in opposite directions, and at different speeds, for kneading and balling the same.

Referring to the drawings, 5 and 6, are vertical standards provided with a horizontally arranged table 7, supported thereon.

8, is a shaft journaled in bearings 9 and 10, carried by the standards 5 and 6. The shaft 8, is held stationary by tightening bolts 30.

11 and 12, represent two beveled disk coöperating wheels provided with hubs 31 and 32, loosely mounted on the shaft 8.

13, is a feed hopper held above the disk-wheels 11 and 12, by means of supports 14 and 15, secured to the shaft 8, and held in required position on said shaft by means of tightening threaded bolts 16. Projecting from the hopper 13, is a substantially telescoping dough retaining band 17, located between the disk-wheels 11 and 12, in position and extending around said wheels and to a point preferably some distance above the receiving table 7, of the machine, for receiving the kneaded and balled dough matter or substance upon removal from the machine, for subsequent treatment, such as baking into a loaf. The overlapping end portions of the band 17, are provided with respective clips 33 and 34, bent to engage and hold the bands one in sliding engagement with the other. In addition to the support of the band by the hopper, the same is supported from brackets 35 and 36, projecting from the standards 5, and 6. The band 17, is so arranged as that it may be readily lengthened or shortened or replaced by another, as clearly shown in Fig. 3.

In the standard 5, is rotatably mounted a shaft 18, to which is secured a driving pulley 19, a gear-wheel 20, and a sprocket-wheel 21, and with the gear-wheel 20, meshes a gear-wheel 22, mounted upon a rotatable shaft 23, journaled in both standards 5 and 6, and which shaft 23, carries a sprocket-wheel 24.

On the hubs 31 and 32, of the disk-wheels 11 and 12, are mounted respectively, large and small sprocket-wheels 25 and 26. These sprocket-wheels 25 and 26, are respectively, connected with the sprocket-wheels 21 and 24, by means of chains 27 and 28, whereby the beveled shape disk-wheels 11 and 12, are adapted to be rotated in opposite directions and at two different rates of speed, when motion is imparted to the driving pulley 19, which in turn is imparted to the gear-wheels 20 and 22, fixed to the shafts 18 and 23.

The dough mass, when deposited in the hopper 13, drops between the disk-wheels 11 and 12, rotating in opposite directions and at different speeds, which causes the dough mass to be rotated and to be slowly fed from right to left in Fig. 1, until it reaches the band, which serves to maintain the dough mass in surface contact with said disk-wheels. This slow forward feed of the dough mass is continued until the same reaches the discharge end 38, of the band 17, whereat it is discharged onto the table 7, for removal therefrom. The aforesaid actions upon the dough mass is to subdivide the large gas and air cells into infinitesimal cells so as hereby to obtain after such treatment by the machine, a fine spongy or minute cellular dough, which when baked into bread, is more wholesome and hence digestible, than dough for baking into bread, hitherto obtainable. Moreover, a dough so kneaded and balled, that is far more cleanly than such could possibly be, by the ordinary manual kneading of a dough mass and setting for the making of bread therefrom.

The two oppositely arranged beveled disk-wheels 11 and 12, may have both faces corrugated or one smooth and the other corrugated, and also the corrugations of one or the other may be at an angle to the plane of the faces thereof. The telescoping dough retaining band or device 17, may be wider in the direction of the discharge end than at the feed end, or vice versa, according to the character of mass to be acted upon, by the oppositely impelled disk-wheels 11 and 12, for holding such mass during kneading and balling, in either the lowest part of the space or chamber formed by the two oppositely arranged beveled face disk-wheels, in action, or at points between such lowermost points of contact of the dough with the faces of said wheels rotating at different speeds, with respect to each other and with the retaining band holding always such doughy mass during such treatment in surface contact with the faces of the disk-wheels 11 and 12. The travel of the dough mass between the faces of the wheels 11 and 12, subject to actions upon the same, by the said wheels, may be lengthened or shortened by loosening the tightening bolts 16, in the supports 14 and 15, for the hopper 13, and shifting the band 17. The band 17, may also be extended or contracted by simply telescoping abutting ends of the band, as will be readily understood from Figs. 1 and 4.

In practice it has been found that the rapid actions on the dough of such a machine, and slow feeding of the dough toward the discharge end of the machine, as hereinbefore described, tends to more thoroughly knead and ball the dough, than hitherto was possible, for insuring the making of a much more wholesome and digestible bread, due to more complete compacting of the dough mass and the subdividing of the normally large gas or air cells of the same into infinitesimal gas or air cells and obtaining thereby a dough mass of a spongy-like character which is much lighter and hence the bread made therefrom is far more digestible.

Having thus described the nature and objects of my invention, what I claim as new and desire to secure by Letters Patent is:—

1. In a machine of the character described, two coöperating beveled face disk-wheels rotatable in opposite directions to roll dough and a telescoping band arranged so as to be adapted to increase or decrease the length of travel of the dough during balling thereof.

2. In a machine of the character described, two coöperating beveled face disk-wheels rotatable in opposite directions and at different speeds to roll dough and a telescoping band arranged between the active faces of said wheels and adapted to increase or decrease the length of travel of the dough during balling thereof.

3. In a machine of the character described, two coöperating rotatable beveled face disk-wheels adapted to travel in opposite directions and at different speeds with respect to each other to roll dough and a dough feed hopper connected with a telescoping band located between the active faces of said disk-wheels for increasing or decreasing the length of travel of the dough during balling thereof.

4. In a machine of the character described, two beveled face coöperating disk-wheels, means for rotating at different speeds with respect to each other to roll dough, a telescoping band located adjacent to the faces of said wheels for increasing or decreasing the length of travel of the dough during balling thereof, a feed hopper and means for shifting the same and therewith said band.

In witness whereof, I have hereunto set my signature in the presence of two subscribing witnesses.

ROBERT M. TEMPLE.

Witnesses:
J. WALTER DOUGLAS,
THOS. M. SMITH.